United States Patent Office 2,969,305
Patented Jan. 24, 1961

2,969,305

MANUFACTURE OF POLYOXYGENATED DEHYDRO-STEROIDS

Albert Wettstein and Ernst Vischer, Basel, and Charles Meystre, Arlesheim, Switzerland, assignors to Ciba Pharmaceutical Products Inc., Summit, N.J.

No Drawing. Filed Feb. 21, 1956, Ser. No. 566,777

Claims priority, application Switzerland Feb. 25, 1955

14 Claims. (Cl. 195—51)

This invention relates to the manufacture of polyoxygenated dehydro-steroids by dehydrogenation and introduction of oxygen in various positions by a biochemical method.

It is already known to introduce oxygen into particular positions in steroids, especially in 11-position, with the aid of micro-organisms (cf. e.g. U.S. Patent No. 2,602,769). In U.S. patent application Serial No. 500,994, filed April 12, 1955, by Albert Wettstein et al., a process is described according to which it is possible by the use of specific fungi, to oxygenate steroids in 17-position. According to U.S. patent appli ation, Serial No. 518,922, now Patent No. 2,778,776, filed June 29, 1955, by Albert Wettstein et al., it is fur her possible by the biochemical method to introduce oxygen into the 21-position of steroids. It is also known that by means of cultures of specific fungi steroids can be oxygenated simultaneously in different positions, for example in 6- and 11-position. According to U.S. patent appl cation, Serial No. 563,437, filed February 6, 1956, by Albert Wettstein at al., now Patent No. 2,949,405, by the microbiological method it is further possible to introduce into steroids the 1:2- and if desired the 4:5 double bond without side chain degradation or ring sp'itt:ng. It has not hitherto been possible, however, in one operation by the biochemical method to introduce oxygen into at least one of the important positions 11, 17 and 21 and a double bond in 1:2- and/or 4:5-position. Such a process would obviously be of great technical importance.

The present invention is based on the observation that polyoxygenated dehydro-steroids can be produced in a simple manner when steroids which are saturated in 1:2- and/or 4:5-position and which are not oxygenated in at least one of the positions 11, 17 and 21, are subjected to the action, in one operation, of enzymes from aerobic cultures of *Calonectria decora, Ophiobolus heterostrophus, Ophiobolus miyabeanus, Alternaria passiflorae,* or *Didymella lycopersici,* which are ca¬ab'e of effecting dehydrogenation in 1:2- and/or 4:5-position and of enzymes from aerobic cultures of at least one of a group of three fungus strains which introduce oxygen in 11-, 17- or 21-position.

The starting materials for the new process are steroids which are saturated in 1:2- and/or 4:5 position, for example derivatives of spirostane, allosp'rostane, furostane, allofurostane, cholane, allocholane, androstane or testane, preferably compounds of the pregnane series, among which are to be understood derivatives of any configuration of 10:13-dimethyl-17-ethyl-cyclopentanopolyhydrophenanthrene and also its higher and lower homologues, for example corresponding A-nor-, D-homo- and 19-nor-compounds. They can be saturated or contain double bonds, for example in 1- or 4 position or also in 5-, 6-, 7-, 8-, 9-, 11-, 14-, 15- and/or 16-position. The configuration of the starting materials is especially that of pregnane, 5α-pregnane, 17α-pregnane or corresponding racemates such as are obtained in total synthesis. As such starting materials there are used primarily compounds which are saturated in 1:2- and/or in 4:5-position and oxygenated in 3- and 20-position and if desired in 18-position and/or in one of the positions 11, 17 and 21 and their functional derivatives, that is to say pregnanes which contain in the specified positions a free or functionally converted oxo or hydroxyl group, as for example esters, ethers, thioethers, thiol or thione esters, acetals, mercaptals, keta's, enol d.r vatives, such as enol esters or enamines, hydrazones, semicarbazones and the like. They can also be further substituted, as for example by free or functicnally converted hydroxyl, oxo or epoxy groups, for example in 6-, 7-, 9-, 11-, 12-, 15-, 16- or 19-position, and especially by halogen atoms, such as chlorine or fluorine in 9-position or by a methyl group in 17α- or 17β-position. Specific starting materials include progesterone, 17α-progesterone, 16α-hydroxy-, 17α-hydroxy-, 18-hydroxy- or 18 oxo-progesterone, cortexone, 18-hydroxy- or 18-oxo-cortexone, 11-keto-progesterone, 11α- and 11β-hydroxy progesterone, 9:11- or 11:12-dehydro-progesterone, 19 hydroxy-progesterone, 9-chloro- or 9-fluoro-11β-hydroxy-progesterone, 11β:18 - dihydroxy - progesterone, 11β-hydroxy-18-oxo-progesterone, 9-chloro- or 9-fluoro-11β-hydroxy-18-oxo-progesterone, 11:18 dioxo progesterone, 19-nor-progesterone, 19-nor-11β hydroxy-18-oxo-progesterone, corresponding compounds unsaturated in 1-position instead of in 4-position, pregnenolone, Δ⁵-pregnene-3:20-diols, pregnane-3:20-dione, pregnene-3-ol-20 one, allopregnane-3:20-dione, pregnane-3:11:20-trione, allopregnane-3:11:20-trione-17α-ol, or their functional derivatives.

The enzymes to be used for the oxidation in 11-position are preferably produced from aerobic cultures of fungi of the genera Rhizopus, Mucor, Aspergillus, Penicillium, Curvularia, Cunninghamella, Spondylocladium or Streptomyces. For the oxidation in 17-position there are suitable enzymes from aerobic cultures of *Trichothecium roseum, Leptosphaeria maculans, Cucurbitaria laburni, Acrospeira levis, Lophotrichus martinii, Melaospora parasitica* or *Thielavia terricola.* The enzymes for the oxidation in 21-position are advantageously obtained with the aid of aerobic cultures of *Ophiobolus herpotrichus* or *Sclerotinia fructicola.* The dehydrogenation in 1:2- and/or in 4:5-position is carried out with enzymes of *Didymella lycopersici, Calonectria decora, A'ternaria passiflorae, Ophiobolus heterostrophus,* or *Ophiobolus miyabeanus.* In the process it is possible to work with isolated or concentrated enzyme preparations, but especially with crude growing fungus cultures, with their filtrates or with mycelium suspensions.

The culture solutions used for the culture of these fungi are suitably agitated, i.e. shaken or stirred and contain assimilable carbon, especially carbohydrates, such as glucose or sucrose and also if desired growth promoting materials, for example corn steep liquor or beer wort and inorganic salts. Thus na:ural, synthetic or semi-synthetic nutrient solutions can be used. Such nutrient solutions are advantageously employed as offer to all the fungi used optimum growth promoting conditions. It is also possible to add la:er specially suitable nutrient and growth promoting substances for the fungi, for example yeast extract.

The process is carried out in one operation. It has however proved to be advantageous to carry out the dehydrogenation and oxygenation at the specified posi ions consecutively. The simplest practical process is described below, but other processes can also be used within the scope of the invention.

The organism required for the first oxygenation or the dehydrogenation is cultivated in similar appararus and under similar conditions to those known in antibiotic manufacture as the so called deep tank process for instance in that the sterilized nutrient solution e.g. beer wort, is inoculated with the microorganism, and then shaken or stirred and aerated for some days, preferably at a temperature of about 27° C. After development of the cultures, the specified starting materials, such as e.g. progesterone or cortexone are introduced in fine dispersion or solution, for example in methanol, acetone or ethylene glycol and incubation is continued until the maximum reaction is attained. Then, without previous filtration or isolation of the reaction product, there is added to the reaction mixture a developed culture of the second organism, and if necessary corresponding nutrient and growth promoting substances and the incubation is then continued, generally for a few days longer. If desired, this operation is repeated with a further micro-organism. The course of the dehydrogenation and of the individual oxygenations can be followed by paper chromatography. Subsequently the liquor is separated from the mycelium and the filtrate and/or the mycelium mass extracted and from the extract the reaction products isolated in the convenional manner, for example by separation processes, adsorption, chromatography, crystallization, conversion into functional derivatives, such as Girard compounds and the like.

The fungus cultures or enzymes can be added in any convenient sequence. By preliminary experiments it can easily be ascertained which sequence offers advantages in any particular case.

According to the present process valuable medicaments are obtained of the steroid and especially of the pregnane series, which are distinguishable from the therapeutically active compounds which are saturated in 1:2-position by an increased activity. Of the products of the process there may be named especially $\Delta^{1:4}$-3:11:20-trioxo - 17α:21 - dihydroxy - pregnadiene, $\Delta^{1:4}$ - 3:20 - dioxo - 11β:17α:21 - trihydroxy - pregnadiene, $\Delta^{1:4}$ - 3:11:20 - trioxo - 21 - hydroxy - pregnadiene, $\Delta^{1:4}$ - 3:20-dioxo - 11β:21 - dihydroxy - pregnadiene, $\Delta^{1:4}$ - 3:20-dioxo - 17α:21 - dihydroxy - pregnadiene, $\Delta^{1:4}$ - 3:20-dioxo - 21 - hydroxy - pregnadiene, $\Delta^{1:4}$ - 3:18:20 - trioxo - 11β:21 - dihydroxy - pregnadiene, $\Delta^{1:4}$ - 3:11:18:20 - tetraoxo - 21 - hydroxy - pregnadiene, $\Delta^{1:4}$ - 3:20-dioxo - 11β:18:21 - trihydroxy - pregnadiene, $\Delta^{1:4}$ - 3:18:20 - trioxo - 11β:17α:21 - trihydroxy - pregnadiene, $\Delta^{1:4}$ - 3:11:18:20 - tetraoxo - 17α:21 - dihydroxy - pregnadiene, $\Delta^{1:4}$ - 3:20 - dioxo - 11β:17α:18:21 - tetrahydroxy - pregnadiene, $\Delta^{1:4}$ - 3:20 - dioxo - 18:21 - dihydroxy - pregnadiene, $\Delta^{1:4}$ - 3:18:20 - trioxo - 21 - hydroxy - pregnadiene, $\Delta^{1:4}$ - 3:20 - dioxo - 17α:18:21 - trihydroxy-pregnadiene, $\Delta^{1:4}$ - 3:18:20 - trioxo - 17α:21 - dihydroxy-pregnadiene, the corresponding 21-oxo- and 21-desoxy-compounds, and also corresponding functional derivatives, such as esters, ethers, halogen derivatives, for example 9α-halogen compounds, especially the fluorine or chlorine compounds. Insofar as the products of the process do not possess the configuration or the substituents of therapeutically useful steroids, they can be used as intermediate products for the manufacture of such compounds, for example of compounds as specified above.

The reaction products resulting from the process of this invention can be converted in the conventional manner into their functional derivatives, such as oxygen, sulphur or nitrogen derivatives, for example esters, ethers, enol esters, enol ethers, ketals, thioethers, and thioketals, or also hydrazones, oximes or enamines. In these compounds, the hydroxyl and/or oxo groups can be completely or partially functionally converted.

In the esters and enol esters the acid residues can be those of any organic or inorganic acids, such as aliphatic, alicyclic, araliphatic, aromatic or heterocyclic carboxylic, thione carboxylic, thiol carboxylic or sulphonic acids, preferably of formic acid, acetic acid, chloracetic acids, trifluoroacetic acid, propionic acid, butyric acids, valeric acids, trimethylacetic acid, diethylacetic acid, caproic acids, oenanthic acids, caprylic acids, palmitic acids, crotonic acid, undecanic acid, undecylenic acid, oxalic acid, succinic acid, pimelic acid, maleic acid, lactic acid, carbamic acids, alkoxy-carboxylic acids, β-cyclopentyl-propionic acid, hexahydrobenzoic acid, benzoic acid, phenylacetic acid, cyclohexyl acetic acid, phenylpropionic acids, trimethy-gallic acid, phthalic acid, furane-2-carboxylic acid, isonicotinic acid, methane sulphonic acid, toluene sulphonic acid, sulphuric acids, hydrohalic acids or phosphoric acids.

If desired, in resulting compounds, functionally converted hydroxyl or oxo groups can be converted into free groups. In this manner, especially in polysubstituted derivatives, the functionally converted groups can also be partially liberated. This can take place, for example, by chemical or enzymatic hydrolysis, for example using acid or basic agents, by re-esterification or re-acetalization. From the only partially converted, for example esterified or etherified derivatives, obtained in this manner or also directly, there can be produced by subsequent functional conversion, for example esterification or etherification, polysubstituted derivatives, especially mixed esters or ethers or ester-ether.

9:11β-oxido-compounds which are obtained can be converted by reaction with hydrohalic acids, especially hydrofluoric and hydrochloric acid, into the corresponding 9:11-halogenhydrins.

The final products of this application such as 1-dehydro-hydrocortisone, 1-dehydro-cortisone, 1-dehydrocorticosterone, 1-dehydro-11-desoxy-corticosterone etc. possess known therapeutic utilities. They are of value in the treatment of various diseases in humans and lower animals involving metabolic and glandular disturbances. Their doses, methods of administration and particular physiological properties are known and described in the literature.

The following examples illustrate the invention.

*Example 1*

In a shaking vessel of 16 liters capacity, 3.6 liters of beer wort are sterilized and inoculated with 400 cc. of a two day old shaking culture of *Ophiobolus herpotrichus* grown in beer wort. The whole is shaken for two days at 27° C., whereby the culture becomes well developed. Then a solution of 1.0 gram of progesterone in 25 cc. of acetone is added under sterile conditions. At the same time, in a second shaking vessel, 3.6 liters of sterile beer wort are inoculated with 400 cc. of a two day old shaking culture of *Calonectria decora*, likewise grown in beer wort. The two vessels are shaken for three days at 27° C. The Calonectria-culture which is now fully developed, is transferred under sterile conditions to the 16 liter vessel, which is now shaken for a further two days at 27° C. The mycelium is then separated and the culture filtrate extracted by shaking four times, each time with 2 liters of ethyl acetate. The extracts are washed three times, in each case with 300 cc. of water, dried and evaporated under vaccum. The resulting residue (1.4 grams) is dissolved in 160 cc. of methanol, 40 cc. of water added and the whole extracted by shaking three times with 50 cc. of pentane each time. The pentane extracts only contain oily impurities, the steroids remaining in the methanolic solution. This is evaporated under vacuum at 30° C. and dried under high vacuum. The residue is chromatographed on 30 grams of silica gel by the fractional elution method, elution being carried out first with chloroform, then with chloroform-acetone mixtures of increasing acetone content and finally with acetone. The individual fractions (each of 100 cc.) are examined by paper-chromatography. The fractions eluted with chloroform contain together with impurities some starting material and the chloroform-acetone (97.5:2.5) mixtures some cortexone (11-desoxy-corticosterone). The majority of the substance is contained in the chloroform-acetone (95:5) fractions and consists for the most part of 1-dehydrocortexone, which is obtained in crystalline form from an acetone-petroleum ether mixture; M.P. 185–193° C.; $[\alpha]_D^{22} = +120°$ (CHCl$_3$). Ultra-violet absorption spectrum (in ethanol) $\lambda$ max, 244 m$\mu$ ($\epsilon = 14,100$).

Example 2

In an Erlenmeyer flask of 500 cc. capacity, 50 cc. of beer wort are sterilized and inoculated with *Ophiobolus herpotrichus*. The culture is shaken at 27° C. After three days it is well developed and there is added thereto under sterile conditions a solution of 15 mg. of progesterone in 0.75 cc. of acetone. At the same time in a second Erlenmeyer flask 50 cc. of beer wort are sterilized and inoculated with a strain of *Curvularia brachyspora*. The two cultures are now shaken in the same way at 27° C. After three days the completely developed Curvularia culture is added under sterile conditions to the Ophiobolus culture. The combined cultures are further shaken. At the same time in a third Erlenmeyer flask 50 cc. of sterile beer wort are inoculated with *Calonectria decora* and shaken at 27° C. After three days this Calonectria culture is added under sterile conditions to the mixture of the two other cultures, whereupon the whole is further shaken at 27° C. After three days, the mycelium is separated off and the culture filtrate extracted by shaking three times with 30 cc. of ethyl acetate each time. The extracts are washed with water, dried and evaporated. Paper chromatographic examination of the residue shows the presence of 1-dehydro-11$\beta$:21-dihydroxyprogesterone (1-dehydro-corticosterone).

If in the above process the progesterone is replaced by 18-oxo-progesterone, 1-dehydro-aldosterone is obtained.

Example 3

As described in Example 2, to a culture of *Ophiobolus herpotrichus* in 50 cc. of beer wort a solution of 15 mg. of progesterone in 0.75 cc. of acetone is added. At the same time, in a second Erlenmeyer flask 50 cc. of sterilized beer wort are inoculated with *Trichothecium roseum*. The two cultures are now shaken at 27° C. After three days, with avoidance of infection, they are combined and the mixture is shaken for a further three days at the same temperature. At the same time in a third Erlenmeyer flask 50 cc. of sterile beer wort are inoculated with *Calonectria decora* and shaken at 27° C. After three days this Calonectria culture is added under sterile conditions to the mixture of the two other cultures, whereupon the whole is further shaken at 27° C. After three days, the mycelium is separated off and the culture filtrate extracted as described in Example 1. The extraction residue is shown by paper chromatographic examination to contain 1-dehydro-17$\alpha$:21-dihydroxy-progesterone.

Example 4

By replacing in Example 3 the progesterone by 11-keto progesterone and incubating in the manner described with cultures of *Ophiobolus herpotrichus*, *Trichothecium roseum* and *Calonectria decora*, a considerable quantity of 1-dehydro-11-keto-17$\alpha$:21-dihydroxy-progesterone (1-dehydro-cortisone) can be detected in the extraction residue.

Example 5

By replacing in Example 3 the progesterone by 11$\beta$-hydroxy-progesterone and incubating in the same way with cultures of *Ophiobolus herpotrichus*, *Trichothecium roseum* and *Calonectria decora*, considerable quantities of 1-dehydro-11$\beta$:17$\alpha$:21-trihydroxy-progesterone (1-dehydro-hydrocortisone) can be detected in the extraction residue.

Example 6

As described in Example 2, there is added under sterile conditions to a culture of *Ophiobolus herpotrichus* in 50 cc. of beer wort, a solution of 15 mg. of progesterone in 0.75 cc. of acetone. At the same time, in a second Erlenmeyer flask 50 cc. of sterile beer wort are inoculated with *Leptosphaeria maculans*. The two cultures are shaken at 27° C. and after three days are combined. At the same time, in a third Erlenmeyer flask 50 cc. of sterile beer wort are inoculated with *Curvularia lunata*. This culture and the previously mentioned culture mixture are shaken for three days at 27° C. as a result of which the Curvularia culture becomes well developed. It is then united under sterile conditions with the culture mixture. The whole is shaken for a further three days at 27° C. At the same time in a fourth Erlenmeyer flask 50 cc. of sterile beer wort are inoculated with *Alternaria passiflorae* and shaken at 27° C. After three days this Alternaria culture is added under sterile conditions to the mixture of the three other cultures, whereupon further shaking is conducted at 27° C. The mycelium is then separated off and the culture filtrate extracted as described in Example 1. The paper chromatographic examination of the extraction residue shows the presence of considerable quantities of 1-dehydro-11$\beta$:17$\alpha$:21-trihydroxy-progesterone (1-dehydro-hydrocortisone) together with 1-dehydro-11-keto-17$\alpha$:21-dihydroxy-progesterone (1-dehydro-cortisone).

Example 7

When the sequence of the additions of the specified cultures as described in Example 6 is varied in such a manner that the progesterone is first incubated with a culture of *Curvularia lunata*, then in the described manner a culture of *Ophiobolus herpotrichus* added, then a culture of *Alternaria passiflorae* and finally one of *Leptosphaeria maculans*, the extraction residue obtained in the customary manner likewise contains 1-dehydro-11$\beta$:17$\alpha$:21-trihydroxy-progesterone (1-dehydro-hydrocortisone) and 1-dehydro-11-keto-17$\alpha$:21-dihydroxy-progesterone (1-dehydro-cortisone).

Example 8

50 cc. of sterile beer wort are inoculated with *Cunninghamella blakesleeana*. The culture is shaken for two days at 27° C. and then, under sterile conditions, a solution of 15 mg. of 11-desoxy-corticosterone (cortexone) in 0.75 cc. of acetone is added. At the same time, in a second Erlenmeyer flask 50 cc. of sterile beer wort are inoculated with *Trichothecium roseum*. The two cultures are shaken separately for a further two days at the same temperature and then combined under sterile conditions and shaking continued. At the same time, in a third Erlenmeyer flask 50 cc. of sterile beer wort are inoculated with *Calonectria decora* and shaken at 27° C. After three days this Calonectria culture is added under sterile conditions to the mixture of the two other cultures, whereupon shaking is further continued at 27° C. After two days the mycelium is separated off. The extraction of the culture filtrate takes place in the same manner as described in Example 2. The extraction residue contains 1-dehydro-11$\beta$:17$\alpha$:21-trihydroxy-progesterone (1-dehydro-hydrocortisone) together with 1-dehydro-11-keto-17$\alpha$:21-dihydroxy-progesterone (1-dehydro-cortisone).

Example 9

In a shaking vessel of 18 liters capacity 3.6 liters of beer wort are sterilized and inoculated with 400 cc. of a two days old shaking culture of *Ophiobolus herpotrichus* which has been grown in beer wort. Shaking is carried on for two days at 27° C., whereby the culture becomes well developed. Then a solution of 1.0 gram of progesterone in 25 cc. of acetone is added under sterile conditions. At the same time, in a second shaking vessel 3.6 liters of sterile beer wort are inoculated with 400 cc. of a three days old shaking culture of *Trichothecium roseum*, likewise cultivated in beer wort. The two vessels are shaken for three days at 27° C. The Trichothecium culture, which is now fully grown, is transferred under sterile conditions to the 18 liter vessel and at the same time, in a further shaking vessel, 3.6 liters of sterile beer wort are inoculated with 400 cc. of a 24 hours old shaking culture of *Calonectria decora* grown in beer wort. This shaking vessel, and also that which contains the culture mixture just described above, are shaken for three days at 27° C. and their contents are combined under sterile conditions. At the same time 3 liters of sterile beer wort are inoculated with 400 cc. of a 36 hours old shaking culture of *Curvularia lunata* grown in beer wort. This culture, and also the culture mixture in the 18 liter flask, are shaken for two days at 27° C. whereupon their contents are combined under sterile conditions. Shaking is continued for two days longer at the specified temperature and then the mycelium is separated off. The culture filtrate is extracted by shaking four times, in each case with three liters of ethyl acetate. The extracts are washed three times, with 500 cc. of water in each case, dried and evaporated. The residue obtained (1.1 grams) is dissolved in 160 cc. of methanol, 40 cc. of water added and the whole extracted by shaking three times, using 50 cc. of pentane each time. The pentane extracts only contain oily impurities, while the steroids remain in the methanolic solution. This is evaporated under vacuum at 30° C. and dried under high vacuum. The residue is chromatographed on 30 grams of silica gel by the fractional elution method, elution being carried out first with methylene chloride, then with chloroform and with chloroform-acetone mixtures and finally with acetone. The individual fractions (150 cc.) are examined by paper chromatography. The fractions eluted with methylene chloride and with chloroform contain impurities, some starting material and 11-desoxy-corticosterone, while in the mixtures of chloroform and acetone (9:1 and 8:2) 1-dehydro-11-keto-17α:21-dihydroxy-progesterone (1-dehydro-cortisone) is contained. The fractions concerned are evaporated and the 1-dehydro-cortisone is obtained after recrystallization from a mixture of acetone and isopropyl ether, in crystals of M.P. 230–233° C. The chloroform-acetone (1:1) fractions contain 1-dehydro-11β:17α:21-trihydroxy-progesterone (1-dehydro-hydrocortisone), which crystallizes from acetone-petroleum ether; M.P. 238–240° C.

Example 10

By using in the method of Example 9 instead of the culture of *Calonectria decora* a culture of *Didymella lycopersici* grown in a similar manner and proceeding otherwise as described in Example 9, there are likewise obtained 1-dehydro-11-keto-17α:21-dihydroxy-progesterone (1-dehydro-cortisone), M.P. 230–233° C. and 1-dehydro-11β:17α:21-trihydroxy-progesterone (1-dehydro-hydrocortisone), M.P. 238–240° C.

Example 11

Quantities of 3.6 liters each of terilized beer wort are separately inoculated with *Ophiobolus herpotrichus, Trichothecium roseum, Didymella lycopersici* and *Curvularia lunata* and shaken at 27° C. After three days the cultures are combined and there is added to the mixture a solution of 1.0 gram of progesterone in 25 cc. of acetone whereupon the whole is further shaken at 27° C. After four days the mycelium is separated. As described in Example 9, the culture filtrate is extracted and the extraction residue chromatographed on silica gel. Again 1-dehydro-cortisone of M.P. 230–233° C. and 1-dehydro-hydrocortisone of M.P. 238–240° C. are obtained.

Example 12

Quantities of 3.6 liters each of sterilized beer wort are separately inoculated with *Ophiobolus herpotrichus, Trichothecium roseum, Didymella lycopersici* and *Curvularia lunata* and shaken at 27° C. After three days the four cultures are combined and the mycelium is separated off and suspended in 5 liters of water. A solution of 1.0 gram of progesterone in 25 cc. of acetone is added and the whole is shaken at 27° C. After four days the suspension is filtered off. As described in Example 9, the filtrate is extracted and the extraction residue chromatographed. There are obtained 1-dehydro-cortisone of M.P. 230–233° C. and 1-dehydro-hydrocortisone of M.P. 238–240° C.

Example 13

120 cc. of sterilized beer wort are inoculated with *Trichothecium roseum* and shaken for three days at 27° C. Then a solution of 40 mg. of 9:11β-oxido-cortexone-21-acetate in 1.5 cc. of acetone is added. At the same time 120 cc. of sterile beer wort are inoculated with *Didymella lycopersici*. Both cultures are shaken at 27° C. After three days they are combined and shaken for a further three days at 27° C. Then the mycelium is filtered off and the culture filtrate extracted by shaking three times with 50 cc. of ethyl acetate each time. The combined extracts are washed with water, dried and evaporated under vacuum. The extraction residue (42 mg.), according to paper chromatographic examination, consists for the most part of 1-dehydro-9:11β-oxido-17α-hydroxy-cortexone. This is purified by preparative paper chromatography (system propylene glycol-toluene) and acetylated with 4 cc. of a mixture of pyridine and acetic anhydride in the customary manner. The resulting crude product is dissolved in 5 cc. of dioxane, mixed with 1.25 cc. of 2.5 N hydrofluoric acid in chloroform and the whole allowed to stand for one hour at room temperature. Water is then added and the whole extracted with chloroform-ether (1:3). After washing with water, drying and evaporation of the solvent under vacuum 1-dehydro-9α-fluoro-hydrocortisone-21-acetate is obtained. It is recrystallized from a mixture of acetone and petroleum ether; M.P. 235–237° C.

Example 14

120 cc. of sterilized beer wort are inoculated with *Trichothecium roseum* and shaken for three days at 27° C. Then a solution of 40 mg. of 9α-fluoro-corticosterone-21-acetate in 1.5 cc. of acetone is added. At the same time 120 cc. of sterile beer wort are inoculated with *Didymella lycopersici*. The two cultures are separately shaken at 27° C. After three days they are combined and shaking continued at 27° C. for a further three days. The mycelium is then separated off and the culture filtrate extracted by shaking three times, in each case with 50 cc. of ethyl acetate. The combined extracts are washed with water, dried and evaporated under vacuum. The extraction residue (42 mg.), according to paper chromatographic examination, consists for the most part of 1-dehydro-9α-fluoro-hydrocortisone. This is purified by means of a preparative paper chromatogram using the system propylene glycol-toluene. The resulting crude product is dried under high vacuum at 40° C., dissolved in 2 cc. of pyridine and treated with 2 cc. of acetic anhydride. After 16 hours standing the whole is poured onto ice. The precipitated crystalline product is filtered off, washed with water, dried and recrystallized from a mixture of acetone and petroleum ether. The resulting 1-dehydro-9α-fluoro-hydrocortisone-21-acetate melts at 235–237° C.

What is claimed is:

1. In a method for dehydrogenating the 1:2-position and oxygenating at least one of the positions 11, 17 and 21 in a $\Delta^4$-3:20-dioxo-pregnene, saturated in the 1:2-position and nonoxygenated in at least one of the positions 11, 17 and 21, the step which comprises subjecting a $\Delta^4$-3:20-dioxo-pregnene, saturated in the 1:2-position and non-oxygenated in at least one of the positions 11, 17 and 21, simultaneously to enzymes from aerobic cultures of fungi selected from the group consisting of *Calonectria decora, Ophiobolus heterostrophus, Ophiobolus miyabeanus, Alternaria passiflorae* and *Didymella lycopersici* for dehydrogenation of the 1:2-position, and to at least one type of enzymes produced from one of the three groups of fungi consisting of (a) the genera Rhizopus, Mucor, Aspergillus, Penicillium, Curvularia, Cunninghamella, Spondylocladium and Streptomyces for oxidation in position 11, (b) the species *Trichothecium roseum, Leptosphaeria maculans, Cucurbitaria laburni, Acrospeira levis, Lophotrichus martinii, Melanospora parasitica* and *Thielavia terricola* for oxidation in position 17 and (c) the species *Ophiobolus herpotrichus* and *Sclerotinia fructicola* for oxidation in position 21, said treatment being carried out in a single operation.

2. A process as set forth in claim 1, wherein the enzymes used are in the form of the crude submerged culture.

3. A process as set forth in claim 1, wherein the enzymes used are in the form of the filtrate of the submerged culture.

4. A process as set forth in claim 1, wherein the enzymes used are in a substantially concentrated form.

5. A process as set forth in claim 1, wherein the starting material is progesterone.

6. A process as set forth in claim 1, wherein the starting material is 11-keto-progesterone.

7. A process as set forth in claim 1, wherein the starting material is 11$\beta$-hydroxy-progesterone.

8. A process as set forth in claim 1, wherein the starting material is cortexone.

9. A process as set forth in claim 1, wherein the starting material is 18-oxo-progesterone.

10. A process as set forth in claim 1, wherein the starting material is pregnane-3:11:20-trione.

11. A process as set forth in claim 1, wherein the starting material is allopregnane-3:11:20-trione-17$\alpha$-ol.

12. A process as set forth in claim 1, wherein the starting material is 9$\alpha$-fluor-corticosterone.

13. A process as set forth in claim 1, wherein the starting material is 9:11$\beta$-oxido-cortexone acetate.

14. A process as set forth in claim 1, wherein the starting material is a 9:11$\beta$-oxido-pregnane compound and the resulting 9:11$\beta$-oxido compound is treated with a hydrohalic acid to obtain the corresponding 9:11-halogenhydrin.

References Cited in the file of this patent

UNITED STATES PATENTS

| | | |
|---|---|---|
| 2,602,769 | Murray et al. | July 8, 1952 |
| 2,649,400 | Murray et al. | Aug. 18, 1952 |
| 2,649,401 | Haines et al. | Aug. 18, 1952 |
| 2,649,402 | Murray et al. | Aug. 18, 1952 |
| 2,658,023 | Shull et al. | Nov. 3, 1953 |
| 2,756,179 | Fried et al. | July 24, 1956 |
| 2,831,798 | McAleer et al. | Apr. 22, 1958 |

OTHER REFERENCES

"Experientia," vol. 9, No. 10, 1953, pages 371 and 372.

Meister, P., et al.: Jour. Am. Chem. Soc. 76, August 5, 1954, pages 4050, 4051.

Meystre, Ch., et al.: Helvetica Chimica Acta, vol. 37, 1954, pages 1548–1553.